Jan. 5, 1932.  C. SPAETH  1,839,609
DISPENSING APPARATUS
Filed April 21, 1930  2 Sheets-Sheet 1
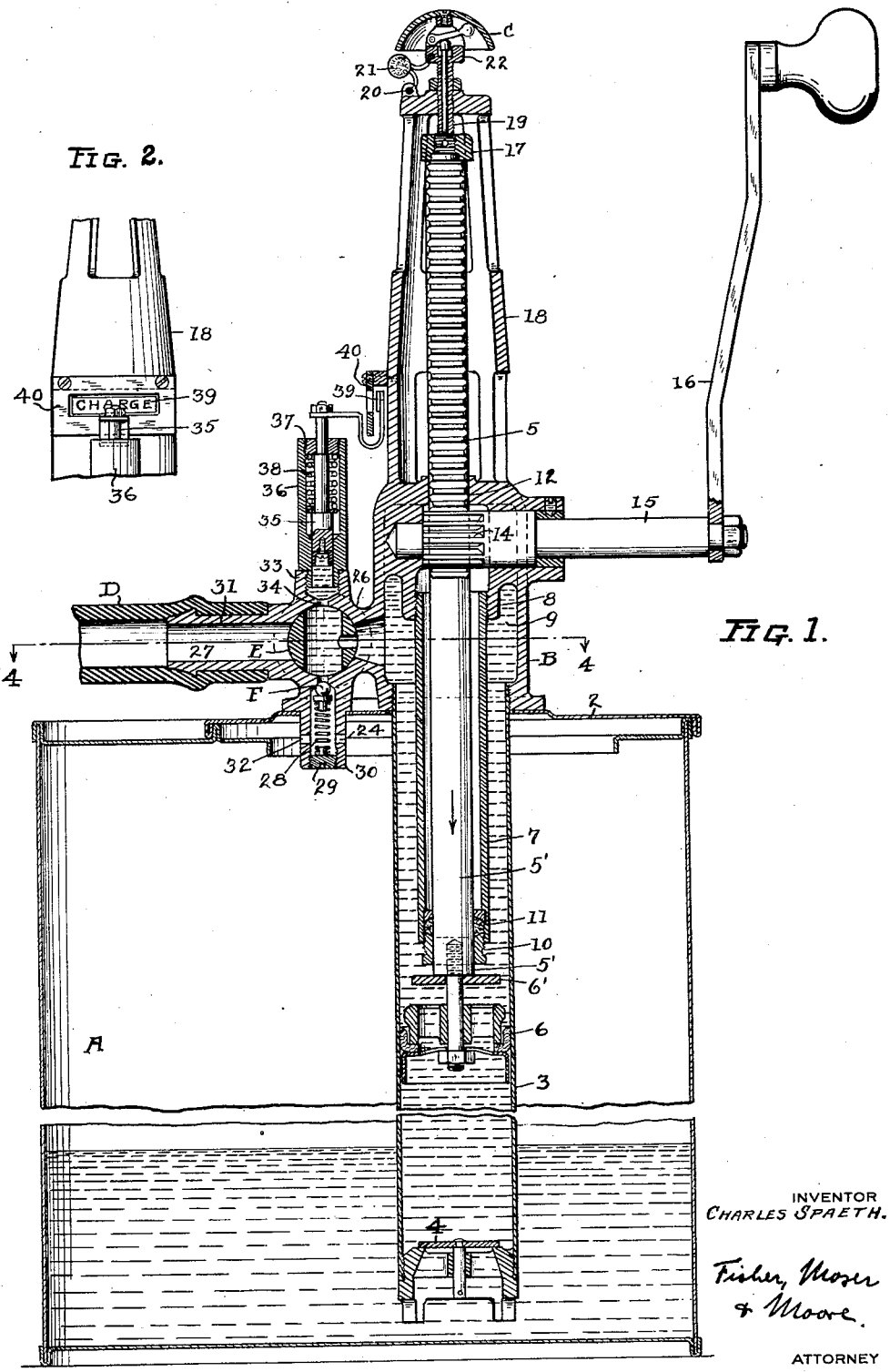
INVENTOR
CHARLES SPAETH.
Fisher, Moser
& Moore.
ATTORNEY Jan. 5, 1932.  C. SPAETH  1,839,609
DISPENSING APPARATUS
Filed April 21, 1930  2 Sheets-Sheet 2
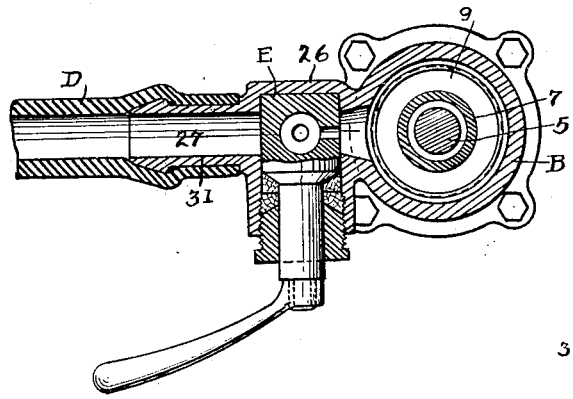
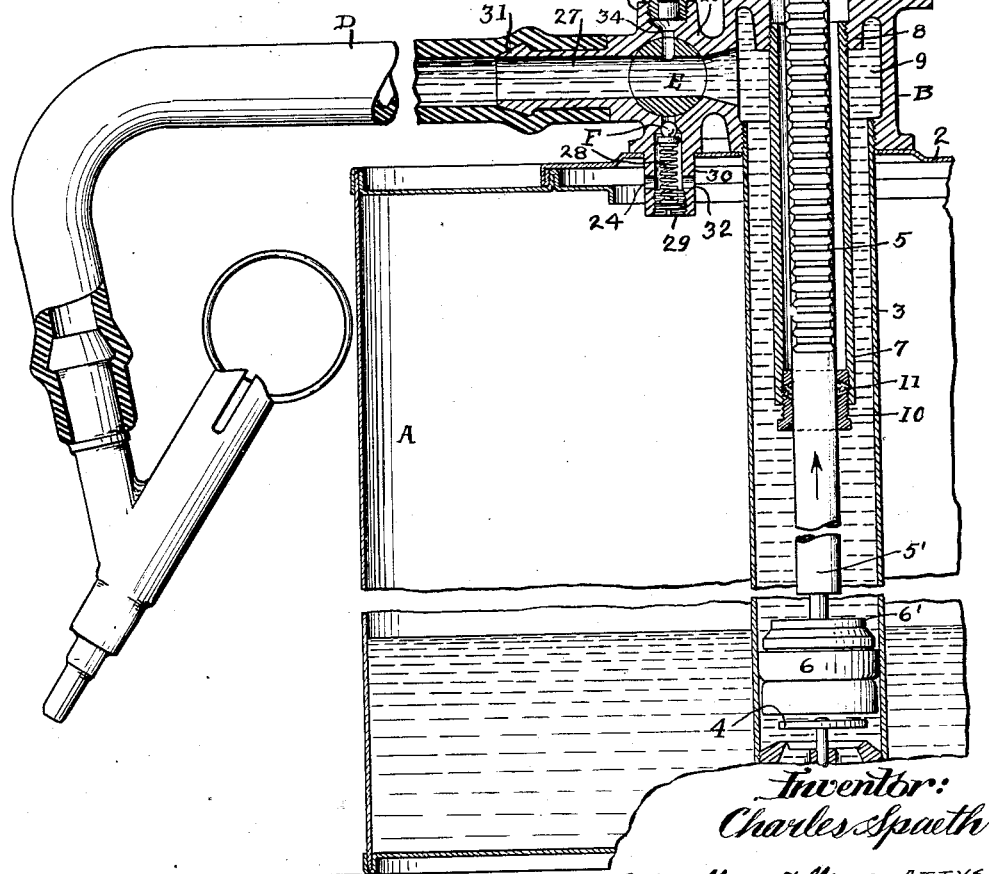
Inventor:
Charles Spaeth
Fisher, Moser & Moore, ATTYS.

Patented Jan. 5, 1932

1,839,609

UNITED STATES PATENT OFFICE

CHARLES SPAETH, OF CLEVELAND, OHIO

DISPENSING APPARATUS

Application filed April 21, 1930. Serial No. 445,900.

This invention relates to dispensing apparatus, and more particularly to a reciprocable pumping apparatus for dispensing measured charges of grease, heavy lubricants or semi-liquid substances. In general the object is to provide a dispensing apparatus which will effect correct measurement, eliminate error, and indicate to the operator and customer when correct measure is not dispensed, and especially indicate when the tank is empty, thus safe-guarding the purchaser from deception and fraud in dispensing operations. To elucidate, dispensing devices of that general type are commonly called grease pumps, and they deliver the grease or lubricant from an invisible supply through a flexible hose having a delivery nozzle or spout which is inserted within a filling opening in an otherwise closed receiving receptacle or vessel, such as a gear housing, transmission case, or the like, in an automobile. The delivered product and the flow thereof is not visible, and the purchaser has no means of knowing with absolute certainty, of the amount of grease delivered; first, because in such pumps a certain amount of air is drawn in with the charge of grease which affects correct measurement; secondly, a certain percentage of grease is sucked or forced back through the hose upon the return stroke of the pump, especially if the operator speeds up the pumping operation and increases the pressure to an extent sufficient to expand the hose; thirdly, the stroke of the pump can be manipulated by the operator to give short measure, and fourthly, it is known that such pumps have been operated idly after the source of supply has been exhausted without either the attendant or purchaser being aware of that fact owing to the concealment of the discharge mouth of the spout, which as has been stated, extends into a closed receiving casing or housing during dispensing operations.

The present apparatus has been especially designed to suck a charge of grease into an over sized measuring chamber and to place the same under compression to decrease the volume of such charge preliminary to dispensing same as a measured quantity. Provision is also made for by-passing or returning the grease in excess of the measured quantity to the supply receptacle. Compression of the grease compensates for the air trapped in the pump so that a full measure of grease will always be dispensed. A loading or charging indicator is also provided which is operatively dependent upon the pressure conditions in the pump, so that the purchaser and attendant may check the measuring operation of the pump and be constantly advised whether an excessive amount of air is being taken in, and/or when the tank or container is empty and the supply depleted or exhausted. The pump is also provided with adjustable means for definitely limiting the stroke of the pump, and the stroke member is also made prominently visible to the purchaser so that he may check the operation thereof by the attendant.

In the accompanying drawings, Fig. 1 is a sectional view of a grease dispensing apparatus embodying my improvement and showing the pump piston at the beginning of its charging or down stroke. Fig. 2 is a front elevation of the upper part of the pump body, showing the indicator raised. Fig. 3 is a sectional view corresponding to Fig. 1, but showing the pump piston at the beginning of its discharge stroke. Fig. 4 is a cross-section of the discharge end of the pump on line 4—4 of Fig. 1.

The apparatus comprises a tank or receptacle A of any suitable character or kind adapted to hold a supply of the goods to be dispensed, for example, lubricating grease. A pump body B is affixed to a cover 2 for this receptacle; and a cylindrical barrel or tube 3 is connected to the bottom of the pump body and extends downwardly into the receptacle a substantial distance, and nearly to its bottom where a check valve 4 is provided at the intake end of the tube. A toothed rack member 5 carrying a ram or piston 6 is reciprocably confined within the barrel or tube, and this rack member is supported to slide within a smaller and shorter tube or pipe 7 which is screw-connected at its upper end to an internal boss 8 within the receiving chamber 9 of pump body B. A nut 10 and packing ring 11 at the lower end of pipe 7 provides a closure member for the pipe and a bearing for the lower end of the rack member.

The upper end of this rack member extends through a second bearing wall 12 in the pump body above a transverse bore or recess containing a pinion 14 forming part of a rotatable shaft, 15, having a crank handle 16. The upper end of the rack member is provided with a screw collar or nut 17 which serves to limit or stop the down stroke of the rack member, and this part of the rack member is constantly exposed to view within the open-sided housing 18 at the top of the pump body. An adjustable screw or bolt 19 is also mounted at the upper end of housing 18 in axial alignment with the rack member to limit or stop the upward movement of the rack member, and a perforated lug 20 on the housing permits a sealing member 21 to be wired thereto and to the perforated head 22 of the stop screw 19 so that pre-adjustments of the screw cannot be changed or tampered with by unauthorized persons. If desired, a bell C may be mounted on screw 19 to give an audible signal upon the completion of the upward stroke of the piston.

Having a given setting each discharge stroke of the pump piston will dispense a given quantity of grease, say one-half pint or about one-half pound. No intermediate stop is provided as it is not particularly desirable to dispense fractional amounts or less than one-half pint. But it is very desirable that a correct measure and the same amount of grease be delivered at each discharge stroke of the piston, and for that purpose the pump is adapted to take in and hold an excess amount of grease, and to by-pass or return a part of each charge to the supply receptacle whenever a predetermined degree of pressure is exceeded in the pump upon the down stroke of the piston. During this stroke all outflow of grease through the flexible delivery hose D is cut off by a rotatable two-way valve member E, and the descent of the valved piston 6 and the plunger portion 5' of rack member 5 places the grease under pressure and compresses the air trapped in the cylinder. The degree of compression is regulated and controlled by a pressure valve F seated within a by-pass opening 24 at the bottom of the main valve body 26. Thus, pressure valve F may be set to permit the by-passing of grease through main valve member E into the upper end of the supply receptacle only when a given pressure, say 400 to 600 lbs. per square inch, is obtained within the pump cylinder upon the down stroke of piston 6. A charge of grease is drawn into the lower end of the pump cylinder past check valve 4 therein when valved piston 6 is caused to move upwardly, and the pump then operates as a lift pump to discharge the previously compressed charge from the upper end of the pump cylinder. Obviously main valve E must be opened to the hose and delivery spout to permit the discharge of grease during the upward stroke of the pump piston, but should an attempt be made to produce an upward stroke of the piston to divert the grease through by-pass 24 into the receptacle while valve E is closed such effort would be abortive or rendered ineffectual owing to a material difference in the working areas of the piston and piston rod on the upward and downward strokes. Thus, as designed, the present pump requires approximately six times more power at the crank handle on the upward stroke than on the downward stroke to produce the same given pressure conditions in the pump cylinder with valve E closed, and this differential is more than sufficient to lock the crank handle against rotative movement or cause breakage or damage to the power-transmitting parts should valve E remain closed on the discharge or up-stroke of the piston. Furthermore, should the operator fail to close valve E on the charging or downward stroke of the piston, the over-charge displaced by the piston rod will be delivered through the open valve and to the purchaser so that the seller is the loser and not the gainer by the failure of the operator to properly operate the device.

As shown, main valve E is of the two-way type adapted to be manually operated, having intersecting passages adapted to register with the by-pass opening 24 and the main discharge passage 27 in body 26. Pressure valve F is a ball valve which is held to its seat by a compression spring 28 and an adjustable nut 29 within a by-pass extension 30 at the bottom of body 26. As shown, valve body 26 is an integral part of the pump body having a discharge nipple 31 to which the flexible hose D is attached, and by-pass extension 30 extends downwardly through the top of receptacle A and is provided with one or more lateral by-pass outlets 32 communicating with the interior of the receptacle.

Valve body 26 is also provided with a screw-threaded boss 33 at its top having a small port 34 therein adapted to register with one end of the intersecting passages in valve member E when rotated to close the main passage 27. A plunger 35 is supported within a hollow cylindrical part 36 connected to boss 33, and the inner end of this plunger is openly exposed to port 34 and the interior of the pump when valve E is closed and bars the discharge of grease through the hose. The upper end of the plunger is reduced in diameter, and extends through a nut 37 screwed into hollow part 36, and a compression spring 38 housed within this part prevents plunger 35 from moving upwardly except under given pressure conditions. Thus, the tension of spring 38 may be adjusted to permit uplift of the plunger 35 only when a predetermined pressure exists within the pump cylinder, say 400 to 600 lbs. to the square inch. Normally when delivering grease the indicator plunger is down, thereby keeping an indicator plate 39 out of sight behind a slotted screen 40. Indicator plate 39 is attached to the upper end of plunger 35 and bears any suitable inscription or information, such as "Charge" to show that the pump cylinder is fully charged and the apparatus is in working condition to deliver the correct measure, but the indicator plate will not display that information unless the intake chamber is full and the charge of grease is first placed under the desired degree of pressure as predetermined by the by-pass valve setting.

In operation, the main valve E is closed by the operator before imparting a down stroke to the pump piston. Assuming the pump cylinder to be full above the piston, when the piston descends the contents in the cylinder beneath the piston cannot escape through the bottom intake because of the check valve thereat. Instead the charge of grease trapped within the lower end of the cylinder is forced through the piston and upwardly past the check valve 6' carried by the piston. The cross-sectional area of the cylinder beneath the piston exceeds the cross-sectional area above it, owing to the presence of the piston rod or rack member within the cylinder. This piston rod or rack member displaces a substantial amount of grease in increasing degree as it descends and emerges from its bearing, because the grease cannot escape from the cylinder when the main valve is closed.

Accordingly, the grease is placed under pressure and the air trapped within the pump body is compressed in increasing degree until the down stroke is completed. In that connection it should be understood that the differential capacities of the cylinder above and below the piston can be readily calculated for any given installation, and suitable allowance made for an overcharge and a given percentage of air drawn in or present in the grease. Consequently, when compression takes place on the down stroke of the piston the percentage of air taken in previously, say two to three cubic inches, will be compressed in the desired degree, preferably until neglible in volume, or in other words until the voids in the grease are filled and a more complete solid charge of grease is obtained within the reduced part of the cylinder. The by-pass valve F may be set to open at 400 to 600 lbs. pressure, and under a given setting the normal intake of air in the grease would be compressed and a correct measure and full charge of grease obtained within the cylinder without by-passing or returning a material amount or any amount into the tank. A high pressure can also be obtained upon the down stroke of the piston and piston rod without undue effort at the crank handle inasmuch as a small pinion and a relatively long handle are employed. In this operation, the piston rod or rack member acts as a hydraulic ram, its working area or cross-sectional size being more or less as may be predetermined for a given apparatus.

Should the grease be free from air, or have less air than the rated percentage for which the pump is designed, the surplus grease forced upward upon the down stroke of the piston will be by-passed into the tank when a given pressure condition is created, thereby again giving a correct measure. On the other hand should more air be taken in at the intake valve of the pump than the estimated percentage, then the pressure developed in the pump will be less than that needed to open the by-pass valve. In that case the plunger and its display plate marked "Charge" will not be raised into view, thereby giving notice that an incomplete measure is present in the pump or that the supply is exhausted. If desired, the indicator may be marked with other notices than the word "Charge" or it may have additional markings adapted to be displayed when the indicator plunger is not raised to indicate that the pump is not charging or that the charge is incorrect or incomplete.

In summary, the present dispensing apparatus includes; first, a measuring chamber adapted to receive a charge in excess of the measured amount to be dispensed, say 10 to 15% in excess; secondly, means for delivering a measured amount correctly in a full cycle of operations with compensation for intake of air into the measuring chamber and any variable or faulty action of the check valves under different temperature conditions and change in consistency of the grease; thirdly, valved means for preventing the discharge of the goods to be dispensed until the correct measure is obtained, and for preventing suctional or forced return of any part of the goods to the measuring chamber after its discharge therefrom; fourthly, automatic means for producing predetermined pressures in the measuring chamber and for by-passing excess amounts of the goods to the supply receptacle under given operating conditions; and fifthly, an indicator subject to the pressure conditions created in the measuring chamber for visibly disclosing to the operator and purchaser whether the apparatus is working and charging correctly or the supply is inadequate or exhausted and no delivery being made.

What I claim is:

1. In an apparatus for dispensing compressed predetermined quantities of a fluid, a fluid-tight chamber of a cubic area in excess of the amount of fluid to be dispensed, means to deliver a charge into said chamber, means to decrease the cubic area of said chamber to compress the charge, a discharge passage for said chamber, controlling means for said discharge passage, and automatic means to by-pass any excess fluid in said compressed charge over and above the predetermined quantity to be dispensed.

2. In an apparatus for dispensing definite charges of a fluid, a lift pump having a definite stroke and a fluid-tight chamber of larger capacity than the amount to be dispensed, an intake valve and a valve piston for said pump chamber, a shut-off valve at the discharge side of said pump, means associated with the pump to decrease the cubic area of said chamber to the volume of the definite quantity of the charge to be dispensed, and automatic means to by-pass any excess fluid in said chamber over and above the said definite quantity adapted to function while the cubic area of said chamber is being decreased.

3. In an apparatus for dispensing compressed predetermined quantities of a fluid, a supply receptacle, a pump having a chamber to receive an over-charge of fluid from said receptacle and provided with a valve at its discharge side, means associated with the pump piston to place the said over-charge under pressure on the downward filling stroke of the pump when said valve is closed, and a valve passage for returning any excess fluid in the compressed charge to said supply receptacle on the same stroke.

4. In an apparatus for dispensing compressed measured charges of a fluid, a lift pump having a fluid-tight chamber of larger capacity than the amount to be dispensed, an intake valve and a valved piston for said pump chamber, a shut-off valve at the discharge side of said pump, means associated with the pump to compress the charge during a part of the pumping cycle, and means for indicating when the desired pressure in said pump chamber is obtained.

5. A method of dispensing compressed measured charges of a fluid from a source of supply, including the steps of drawing a charge of fluid into a chamber having a larger cubic area than the charge to be dispensed, compressing said charge to decrease the volume thereof to the desired volume to be dispensed while by-passing any portion of said compressed charge of fluid in excess of the charge to be dispensed back to said source of supply, and then discharging the remainder of said compressed charge of fluid from said chamber.

6. In an apparatus for dispensing compressed measured charges of a fluid, a fluid-tight chamber of a cubic area in excess of the amount of compressed fluid to be dispensed, means to deliver a charge into said chamber, means to decrease the cubic area of said intake chamber to compress the charge therein, means to indicate when the charge in said chamber has been subjected to the desired dispensing pressure, a discharge passage for said intake chamber, controlling means for said discharge passage, and automatic means to by-pass surplus compressed fluid in said charge in excess of the desired quantity to be dispensed.

7. In an apparatus for dispensing compressed measured charges of a fluid, a fluid-tight chamber of a cubic area in excess of the charge of compressed fluid to be dispensed, intake and outlet connections for said chamber, means to draw a charge of fluid into said chamber, means to compress the charge in said chamber and decrease the volume thereof, means to visibly indicate when said charge is placed under the desired dispensing pressure, means for controlling the outlet of said chamber, and automatic means at the discharge side of said chamber to by-pass surplus compressed fluid in said charge in excess of the desired quantity of fluid to be dispensed.

8. In an apparatus for dispensing compressed measured charges of a fluid, a fluid-tight intake and compression chamber of a cubic area in excess of the amount of compressed charge to be dispensed, inlet and outlet connections for said chamber, controlling means for said inlet and outlet, a reciprocatory piston within said chamber, a shiftable plunger rod for operating said piston extending from the outside into said chamber and adapted to reduce the cubic area of the chamber and thereby compress the fluid therein when shifted with respect to said chamber, an automatically controlled by-pass in the outlet of said chamber, and an automatic pressure actuated indicating mechanism to visibly indicate when the desired dispensing pressure is obtained within said chamber.

9. In an apparatus for dispensing compressed measured charges of a fluid, a fluid-tight intake and compression chamber of a cubic area in excess of the amount of compressed charge to be dispensed, inlet and outlet connections for said chamber, controlling means for said inlet and outlet, a reciprocatory piston within said chamber, a shiftable plunger rod for operating said piston extending from the outside into said chamber and adapted to change the cubic area of the chamber and thereby compress the fluid therein when shifted with respect to said chamber, an automatically controlled by-pass in the outlet of said chamber, and an automatic pressure actuated mechanism including a spring-pressed plunger and means coupled with said plunger to visibly indicate when the desired dispensing pressure is obtained in said chamber.

In testimony whereof I affix my signature

CHARLES SPAETH.